(12) United States Patent
Masaryk (10) Patent No.: US 11,476,521 B2
(45) Date of Patent: Oct. 18, 2022

(54) FLUID CONNECTOR FOR A BATTERY PACK OF A VEHICLE, AND BATTERY PACK FOR A VEHICLE INCLUDING THE SAME

(71) Applicant: Samsung SDI Co., Ltd., Yongin-si (KR)

(72) Inventor: Carl-Michael Masaryk, Graz (AT)

(73) Assignee: SAMSUNG SDI CO., LTD., Yongin-si (KR)

(*) Notice: Subject to any disclaimer, the term of this patent is extended or adjusted under 35 U.S.C. 154(b) by 136 days.

(21) Appl. No.: 16/770,748

(22) PCT Filed: Jan. 29, 2019

(86) PCT No.: PCT/KR2019/001200
§ 371 (c)(1),
(2) Date: Jun. 8, 2020

(87) PCT Pub. No.: WO2019/151743
PCT Pub. Date: Aug. 8, 2019

(65) Prior Publication Data
US 2021/0175564 A1    Jun. 10, 2021

(30) Foreign Application Priority Data

Jan. 31, 2018  (EP) .................................... 18154416
Apr. 12, 2018  (EP) .................................... 18167045
Jan. 28, 2019  (KR) ...................... 10-2019-0010673

(51) Int. Cl.
*H01M 10/6568*  (2014.01)
*H01M 10/625*  (2014.01)
(Continued)

(52) U.S. Cl.
CPC ..... *H01M 10/6568* (2015.04); *H01M 10/625* (2015.04); *H01M 50/249* (2021.01); *H01M 50/262* (2021.01)

(58) Field of Classification Search
CPC .......... H01M 10/625; H01M 10/6568; H01M 50/249; H01M 50/262
See application file for complete search history.

(56) References Cited

U.S. PATENT DOCUMENTS 8,397,756 B2      3/2013  Packham et al.
2011/0070475 A1*  3/2011  Thomas .............. H01M 50/502
                                                  429/120
(Continued)

FOREIGN PATENT DOCUMENTS

DE    10 2012 009 492 A1   11/2013
DE    10 2013 212 851 A1    1/2015
(Continued)

OTHER PUBLICATIONS

Machine translation of FR2781311A1 (Year: 2000).*
Extended European Search Report for European Patent Application No. 18167045.6, dated Sep. 27, 2018, 7pp.

*Primary Examiner* — Jonathan G Jelsma
(74) *Attorney, Agent, or Firm* — Lewis Roca Rothgerber Christie LLP (57) ABSTRACT

The present invention refers to a fluid connector for a battery pack of a vehicle, and to a battery pack for a vehicle. The fluid connector, with a main conduit and at least one connection conduit that protrudes from a first side of the main conduit, wherein a fluid flow path extends from the main conduit to and through the connection conduit, and wherein the fluid connector comprises a fastener with at least one latch device for fastening the fluid connector to the battery pack, the fastener being arranged at a second side of the main conduit, the second side being arranged opposite to the first side.

15 Claims, 8 Drawing Sheets

(51) Int. Cl.
  *H01M 50/249* (2021.01)
  *H01M 50/262* (2021.01)

(56) References Cited

U.S. PATENT DOCUMENTS

| | | |
|---|---|---|
| 2011/0274958 A1 | 11/2011 | Iritani et al. |
| 2012/0042977 A1 | 2/2012 | Gadawski |
| 2012/0043754 A1 | 2/2012 | Gadawski |
| 2015/0207187 A1 | 7/2015 | Beltz et al. |
| 2017/0098875 A1 | 4/2017 | Kim |
| 2017/0365888 A1 | 12/2017 | Kwon et al. |
| 2019/0288357 A1 | 9/2019 | Son et al. |

FOREIGN PATENT DOCUMENTS

| | | |
|---|---|---|
| FR | 2 781 311 A1 | 1/2000 |
| JP | 2012-15072 A | 1/2012 |
| KR | 10-1393528 B1 | 5/2014 |
| KR | 10-1622096 B1 | 5/2016 |
| KR | 10-2017-0040619 A | 4/2017 |
| KR | 10-2017-0142448 A | 12/2017 |
| WO | WO 2017/150802 A1 | 9/2017 |

\* cited by examiner

FLUID CONNECTOR FOR A BATTERY PACK OF A VEHICLE, AND BATTERY PACK FOR A VEHICLE INCLUDING THE SAME

CROSS-REFERENCE TO RELATED APPLICATION(S)

This application is a National Phase Patent Application of International Patent Application Number PCT/KR2019/001200, filed on Jan. 29, 2019, which claims priority of European Patent Application No. 18154416.4, filed Jan. 31, 2018, European Patent Application No. 18167045.6, filed Apr. 12, 2018, and Korean Patent Application No. 10-2019-0010673, filed Jan. 28, 2019. The entire contents of all of which are incorporated herein by reference.

TECHNICAL FIELD

The present invention relates to a fluid connector for a battery pack of a vehicle and to a battery pack for a vehicle including the same.

BACKGROUND ART

In the recent years, vehicles for transportation of goods and people have been developed using electric power as a source for motion. Such an electric vehicle, for example an automobile, is propelled by an electric motor, using energy stored in rechargeable batteries. An electric vehicle may be solely powered by batteries or may be a form of hybrid vehicle powered by for example a gasoline generator. Furthermore, the vehicle may include a combination of electric motor and conventional combustion engine. In general, an electric-vehicle battery (EVB) or traction battery is a battery used to power the propulsion of battery electric vehicles (BEVs). Electric-vehicle batteries differ from starting, lighting, and ignition batteries because they are designed to give power over sustained periods of time. A rechargeable or secondary battery differs from a primary battery in that it can be repeatedly charged and discharged, while the latter provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, e.g. cylindrical or rectangular, depends on the battery's intended purpose. Lithium-ion (and similar lithium polymer) batteries, widely known via their use in laptops and consumer electronics, dominate the most recent group of electric vehicles in development.

Rechargeable batteries may be used as a battery module formed of a plurality of unit battery cells coupled in series and/or in parallel so as to provide a high energy density, in particular for motor driving of a hybrid vehicle. That is, the battery module is formed by interconnecting the electrode terminals of the plurality of unit battery cells depending on a required amount of power and in order to realize a high-power rechargeable battery.

A battery pack is a set of any number of (preferably identical) battery modules. They may be configured in a series, parallel or a mixture of both to deliver the desired voltage, capacity, or power density. Components of battery packs include the individual battery modules, and interconnects, which provide electrical conductivity between them. A battery management system (BMS) is provided for managing the battery pack, such as by protecting the battery from operating outside its safe operating area, monitoring its state, calculating secondary data, reporting that data, controlling its environment, authenticating it and/or balancing it.

To provide thermal control of the battery pack a thermal management system is required to use the at least one battery module within a predefined temperature range by efficiently emitting, discharging and/or dissipating heat generated from its rechargeable batteries. If the heat emission/discharge/dissipation is not sufficiently performed, temperature deviations occur between respective battery cells, such that the at least one battery module cannot generate a desired amount of power. In addition, an increase of the internal temperature can lead to abnormal reactions occurring therein and thus charging and discharging performance of the rechargeable deteriorates and the life-span of the rechargeable battery is shortened. Thus, cell cooling for effectively emitting/discharging/dissipating heat from the cells is required. The cooling is usually done by a cooling fluid that is led to and through a cooling fluid path of the batter pack.

The mechanical integration of such a battery pack requires appropriate mechanical connections between the individual components, e.g. of battery modules, and between them and a supporting structure of the vehicle. These connections must remain functional and save during the average service life of the battery system. Further, installation space and interchangeability requirements must be met, especially in mobile applications.

However, due to designs requirements, inflow and outflow ports for the cooling liquid provided by vehicles or battery management systems are often not arranged such that the battery pack can be directly connected to these ports. Hence, fluid connectors are provided that connect the battery pack to the vehicle or the battery management system in a fluid conducting manner. Mounting these fluid connectors is burdensome, for example due to the very limited mounting space available or as fluid and mechanical connections need to be made separately.

DISCLOSURE

Technical Problem

It is thus an object of the present invention to overcome or reduce at least some of the drawbacks of the prior art and to provide a fluid connector that can be mounted with low effort.

Technical Solution

According to the invention, a fluid connector a battery pack of a vehicle comprises a main conduit and at least one connection conduit that protrudes from a first side of the main conduit, wherein a fluid flow path extends from the main conduit to and through the connection conduit, and wherein the fluid connector comprises a fastener with at least one latch device for fastening the fluid connector to the battery pack, the fastener being arranged at a second side of the main conduit, the second side being arranged opposite to the first side. Also, according to the invention, a battery pack comprises a fluid flow path that extends through the battery pack, and a groove at an outer side of the battery pack, wherein a base side of the groove comprises an opening of the fluid flow path and a counter fastener with at least one counter latch device, the counter device element being arranged at a distance to the opening.

Due to the arrangement of the fastener on the second side with the connection conduit on the opposite, first side, and the counter latch element on the base side of the groove, the fluid connector can be easily installed in the groove as well as affixed to the battery pack and to an in- or outflow port of the vehicle and/or the battery management system in one single step.

The invention can be improved by the following embodiments, which, unless explicitly stated to the contrary, can be combined as desired and are advantageous on their own, in each case.

According to an embodiment of the fluid connector, the connection conduit and the fastener are aligned after each other, for example along that part of the fluid flow path that extends through the connection conduit. An advantage of this embodiment may be that forces applied to the connection conduit when connecting the connection conduit to an in- or outflow port are effectively transmitted to the latch device.

According to an embodiment of the fluid connector, the connection conduit comprises an outer wall that extends along a longitudinal direction of the connection conduit, wherein the at least one latch device is surrounded by a projection of the outer wall, the projection extending in the longitudinal direction. For example, the longitudinal direction is arranged parallel to the direction of the fluid flow path in the connection conduit. An advantage of this embodiment may be that forces applied to the connection conduit when connecting the connection conduit to the in- or outflow port are more effectively transmitted to the fastener and in particular to the at least one latch device compared to latch devices that may be present further away from the connection conduit.

According to an embodiment of the fluid connector, the fastener comprises several latch devices, wherein at least selected or even all of the latch devices are arranged at an edge of an imaginary circle, i.e. a circle that does not need to be formed on or at the second side, but which is defined by the positions of the latch devices. An advantage of this embodiment may be that forces applied to the connection conduit when connecting the connection conduit to the in- or outflow port are evenly distributed among the selected latch devices, such that all of the selected latch devices are forced to form a fit with a respective counter latch device with the same or similar forces, thereby facilitating the formation of the fit between all of the latch devices with the respective counter latch device.

According to an embodiment of the fluid connector, the center of the imaginary circle is arranged on a longitudinal axis of the connection conduit. For example, the longitudinal axis is arranged parallel to the direction of the fluid flow path in the connection conduit and/or to the longitudinal direction. An advantage of this embodiment may be that forces applied to the connection conduit when connecting the connection conduit to the in- or outflow port are even more uniformly distributed among the selected latch devices, such that all of the selected latch devices are forced to form a fit with a respective counter latch device with the same or similar forces, thereby further facilitating the formation of the fit between all of the latch devices with the respective counter latch device.

According to an embodiment of the fluid connector, at least the selected or all of latch devices comprise an elastically deformable latch arm and a latch element, wherein the latch elements each extend parallel to a radial direction of the imaginary circle, the respective radial direction extending through the respective latch device. For example, the latch elements may be latch protrusions or latch recesses that extend towards or away from the center of the imaginary circle and/or the longitudinal axis of the connection conduit and/or the part of the flow path that extends through the connection conduit. The latch arms may extend along the longitudinal direction of the connection conduit. An advantage of this embodiment may be that rotational forces that may act around the center of the imaginary circle and/or the longitudinal axis of the connection conduit and/or the part of the flow path while connecting or disconnecting the connection conduit to or from the in- or outflow port do not affect the latch connection between the latch devices and the respective counter latch devices.

According to an embodiment of the fluid connector, the fastener comprises an elastically deformable press element that surrounds the at least one latch device. For example, the at least one latch device surmounts the deformable press element along the longitudinal direction of the connection conduit. An advantage of this embodiment may be that the deformable press element is deformed and e.g. compressed while forming the latch fit between the at least one latch device and the at least one counter latch device, and remains to be deformed (e.g. compressed) while the latch fit exists, thereby generating mechanical tension in the latch fit and avoiding that the connection between the at least one latch device and the at least one counter latch device has an undesired amount of clearance.

According to an embodiment of the fluid connector, the press element has a ring shape. For example, a center of the ring shape may coincide with the center of the imaginary circle and/or the longitudinal axis of the connection conduit. An advantage of this embodiment may be that the elastic forces caused by the press element are evenly distributed, for example in case the at least one latch device is at the center of the ring shape and/or in case several latch devices are arranged symmetrically around the center of the ring shape, for example on the imaginary circle. The imaginary circle may have a smaller or, as an alternative, a larger diameter than the press element.

According to an embodiment of the fluid connector, the fluid connector comprises another connection conduit that protrudes from the second side of the main conduit, wherein the fluid flow path may extend from the other connection conduit to and through the main conduit. An advantage of this embodiment may be that the other connection conduit can be connected to the opening of the fluid flow path of the battery pack, wherein, simultaneously, the latch device is connected to the counter latch device, thereby further facilitating mounting the fluid connector.

According to an embodiment of the fluid connector, the fluid connector comprises another fastener with a plurality of the latch devices, wherein the other latch devices of the other fastener are arranged on the second side around the other connection conduit. An advantage of this embodiment may be that the connection between the fluid connector at the battery pack is even more stable without affecting mountability of the fluid connector.

According to an embodiment of the fluid connector, at least two of the other latch devices of the other fastener are arranged on a side of an imaginary polygon, the other connection conduit being arranged within the imaginary polygon. Again, the imaginary polygon may not be formed as such, but can be defined by the other latch devices. An advantage of this embodiment may be that, although the holding forces of the latch connection between the other latch devices of the other fastener and other counter latch devices of the battery back are evenly distributed and comparable to latch devices arranged at an edge of a circle, the space required for the other fastener perpendicular to the part of the fluid flow path that extends through the other connection conduit is reduced. Hence, the connection conduit and the other connection conduit may both have similar or even identical diameters.

According to an embodiment of the fluid connector, at least two of the other latch devices of the other fastener are arranged on each side of the polygon. An advantage of this embodiment may be that the strength of the fit between the other latch devices and the other counter latch devices are not only increased, but further the distribution of this strength is more uniform.

According to an embodiment of the fluid connector, the fastener is arranged on a section of the second side that is closer to a first end of the main conduit than to a second end of the main conduit, the first end being opposite the second end, e.g. along the part of the fluid flow path that extends through the main conduit. An advantage of this embodiment may be that pressure can be more easily applied and/or transferred at or closer to an end than at a center of the fluid connector, such that the latch connection between the other latch devices and the outer counter latch devices can be made more easily.

According to an embodiment of the fluid connector, the other fastener is arranged closer to the second end than to the first end. An advantage of this embodiment may not only be that the latch connection between the at least one latch device and the at least one counter latch device can be made more easily, but also that forces that seek to open the latch connections and act on the fluid connector, for example evoked by the in- or outflow port, are effectively absorbed, in particular in case the connection conduit is aligned with the fastener, as lever length between the fastener and the connection conduit is reduced, maybe even to zero.

According to an embodiment of the fluid connector, the parts of the fluid flow path that extend through the connection conduit and the other connection conduit are aligned parallel to each other and/or perpendicular to the part of the fluid flow path that extends through the main conduit. An advantage of this embodiment may be that the fluid connector facilitates connecting the battery pack to an in- or outflow port is a space saving manner.

According to an embodiment of the fluid connector, the main conduit has a rectangular cross section. An advantage of this embodiment may be that a flow-through cross-section of the main conduit is larger compared to a conduit with a circular cross-section and at similar requirement for installation space of the main conduit defined by the groove. Hence, more liquid can flow through the main conduit at the same current velocity, or the same amount of liquid can flow through the main conduit at a reduced current velocity, thereby improving fluid supply and/or reducing flow resistance.

According to an embodiment of the fluid connector, the cross section of the connection conduit and/or the other connection conduit is circular. An advantage of this embodiment may be that connections between the connection conduit and/or the other connection conduit with the in- or outflow port and/or the opening of the fluid flow path that extends through the battery pack can be made and/or sealed easily.

According to an embodiment of the fluid connector, at least surfaces on which the at least one latch device and/or the at least one other latch device are based are flat and extend perpendicular to the parts of the fluid flow path that extend through the connection conduit and/or the other connection conduit. An advantage of this embodiment may be that production of the fluid connector and the groove is facilitated, as the surfaces are flat and no recesses need to be formed for any protruding parts of the surfaces.

According to an embodiment of the fluid connector, the surfaces on which the at least one latch device and/or the at least one other latch device are based are arranged at a distance to other parts of the second side, the distance extending from the second side away from the main conduit. An advantage of this embodiment may be that a latch connection between the at least one latch device and/or the other latch devices with the at least one counter latch device and/or with the other counter latch devices can be made easily, as due to the elevated position of the surfaces, collisions with parts of the groove and in particular of the base side are avoided.

According to an embodiment of the fluid connector, the other connection conduit comprises a groove along its outer circumference for at least partly receiving a sealing ring. An advantage of this embodiment may be that sealing between the other connection conduit and the opening of the battery pack can be achieved by simply inserting the other connection conduit into the opening, such that the sealing ring, present in the groove, seals a gap between the outer side of the connection conduit and the inner side of the opening.

According to an embodiment of the battery pack, the counter fastener comprises several counter latch devices, wherein at least selected of the counter latch devices are arranged at an edge of an imaginary circle, i.e. a circle that is defined by the positions of the counter latch devices. The imaginary circle defined by the latch devices and the imaginary circle defined by the counter latch devices are identical according to an embodiment. An advantage of this embodiment may be that forces applied to the connection conduit when connecting the connection conduit to the groove of the battery pack are evenly distributed among the selected counter latch devices, such that of the selected counter latch devices are all forced to form a fit with a respective latch device with the same or similar forces, thereby facilitating the formation of the fit between all of the latch devices with the respective counter latch device.

According to an embodiment of the battery pack, at least the selected counter latch devices comprise an elastically deformable latch arm and/or a counter latch element, wherein the counter latch elements each extend parallel to a radial direction of the imaginary circle, the respective radial direction extending through the respective counter latch device. For example, the counter latch elements may be latch protrusions or latch recesses that extend towards or away from the center of the imaginary circle. In case the fluid connector is assembled to the battery pack, the counter latch elements may be matching (or complementary) to the latch elements. The latch arms may extend perpendicular to and be based on the base side. An advantage of this embodiment may be that rotational forces that may act around the center of the imaginary circle while connecting or disconnecting the connection conduit to or from the battery pack do not affect the latch connection between the latch devices and the respective counter latch devices.

According to an embodiment of the battery pack, the base side of the groove comprises a flat counter press section for the elastically deformable press element, which the elastically deformable press element completely contacts in an assembled state of the fluid connector in which it is assembled to the battery pack. For example, the at least one counter latch device surmounts the counter press section away from the base side of the groove. Alternatively, the counter latch device and in particular its latch element may be arranged in a hole that extends into the base side. An advantage of this embodiment may be that the deformable press element is uniformly deformed and e.g. compressed while forming the latch fit between the at least one latch device and the at least one counter latch device is formed, and remains to be deformed or compressed while the latch fit exists, thereby generating mechanical tension in the latch fit and avoiding that the connection between the at least one latch device and the at least one counter latch device has an undesired amount of clearance.

According to an embodiment of the battery pack, the counter press section has a circular or ring shape. For example, a center of the circular or ring shape may coincide with the center of the ring shape of the elastically deformable press element. An advantage of this embodiment may be that the elastic forces caused by the press element are evenly distributed, for example in case the at least one counter latch device is at the center of the circular or ring shape and/or on case several counter latch devices are arranged symmetrically around the center of the circular of ring shape, for example on the imaginary circle. The imaginary circle may have a smaller or a larger diameter than the counter press section.

According to an embodiment of the battery pack, the battery pack comprises another counter fastener with a plurality of counter latch devices, wherein the counter latch devices of the other counter fastener are arranged on the base side of the groove and in particular around the opening. An advantage of this embodiment may be that the connection between the fluid connector at the battery pack is even more stable.

According to an embodiment of the battery pack, at least two of the counter latch devices of the other counter fastener are arranged on a side of an imaginary polygon, the opening being arranged within the polygon. An advantage of this embodiment may be that, although the holding forces of the latch connection between the other latch devices of the other fastener and the other counter latch devices of the battery back are evenly distributed and comparable to latch devices arranged at an edge of a circle, the space required for the other counter fastener perpendicular to the groove is reduced.

According to an embodiment of the battery pack, at least two of the counter latch devices of the other counter fastener are arranged on each side of the polygon. An advantage of this embodiment may be that the strength of the fit between the other latch devices and the other counter latch devices are not only increased, but further the distribution of this strength is more constant, again without unnecessarily increasing the required installation space.

According to an embodiment of the battery pack, the counter fastener is arranged on a section of the base side that is closer to a first end of the base side than to a second end of the base side, the first end being opposite the second end along an imaginary line between the counter fastener and the other counter fastener. An advantage of this embodiment may be that pressure can be more easily applied and/or transferred at or closer to an end than at a center of the groove, such that the latch connection between the at least one latch device and the at least one counter latch device can be made more easily.

According to an embodiment of the battery pack, the other counter fastener is arranged closer to the second end than to the first end. For example, the counter fastener and the other counter fastener, respectively, are arranged at the opposite ends of the base side. An advantage of this embodiment may not only be that the latch connections can be made more easily, but also that forces that seek to open the latch connections and act on the fluid connector, for example by the in- or outflow port, are effectively absorbed.

Advantageous Effects

According to the fluid connector of the present invention, it is possible to facilitate mounting the fluid connector to the battery pack.

DESCRIPTION OF DRAWINGS

Features will become apparent to those of ordinary skill in the art by describing in detail exemplary embodiments with reference to the attached drawings in which.

MODE FOR INVENTION

Reference will now be made in detail to embodiments, examples of which are illustrated in the accompanying drawings. In the drawings, like reference numerals denote like elements, and redundant descriptions are omitted. As used herein, the term "and/or" includes any and all combinations of one or more of the associated listed items.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention.

In the following description of exemplary embodiments of the present invention, the terms of a singular form may include plural forms unless the context clearly indicates otherwise.

It will be further understood that the terms "include," "comprise," "including," or "comprising" specify a property, a region, a fixed number, a step, a process, an element, a component, and a combination thereof but do not exclude other properties, regions, fixed numbers, steps, processes, elements, components, and combinations thereof.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
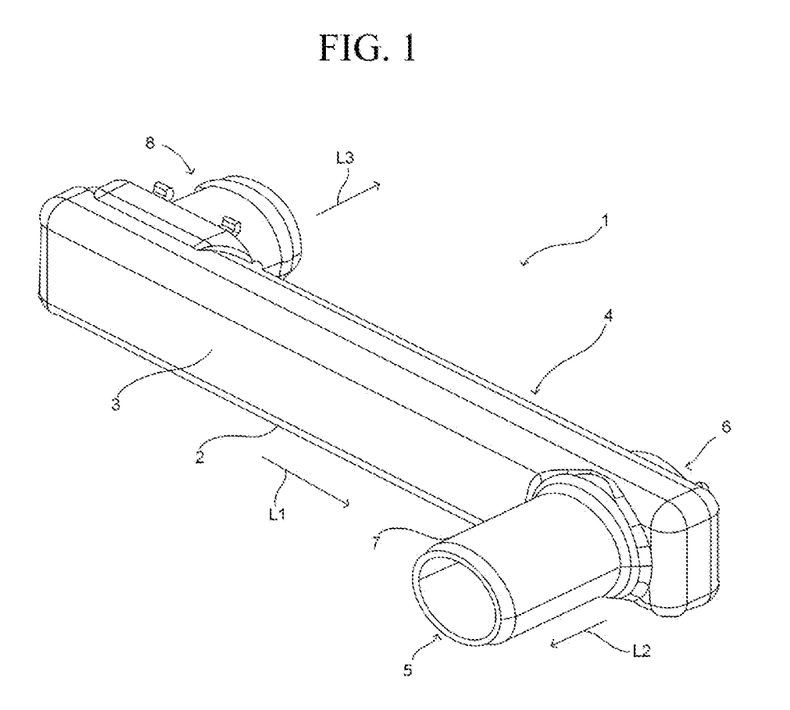
FIG. 1 illustrates a schematic perspective view of a fluid connector according to an exemplary embodiment.

FIG. 1 shows an exemplary embodiment of the fluid connector 1 in a schematic perspective view. The fluid connector 1 comprises a main conduit 2, which may have a rectangular cross-section perpendicular to it's a first longitudinal direction L1. A flow path defined by the fluid connector 1 extends through the main conduit 2 along the first longitudinal direction L1. The main conduit 2 comprises a first side 3 and a second side 4 opposite the first side 3. A connection conduit 5 for connecting the fluid connector 1 to an in- or an outflow port for fluid or liquid protrudes from the first side 3 of the main conduit 2. The flow path extends from the main conduit 2 to and through the connection conduit 5.

A fastener 6 for fastening the fluid connector 1 to a battery pack is arranged at the second side 4 of the main conduit 2. The fastener 6 may be aligned with the connection conduit 5, for example along a second longitudinal direction L2 of the connection conduit 5. The first and second longitudinal directions L1, L2 may extend perpendicular to each other. In particular, the connection conduit 5 and the fastener 6 may be arranged after each other along the second longitudinal direction L2.

The connection conduit 5 may be tube-shaped with an outer wall 7 that extends along the second longitudinal direction L2. The fastener 6 may at least partly be surrounded by a projection of the outer wall 7, wherein the projection extends along the second longitudinal direction L2.

As shown in the exemplary embodiment of FIG. 1, the fluid connector 1 may comprise another connection conduit 8 that protrudes from the second side 4 of the main conduit 2. A third longitudinal direction L3 of the other connection conduit 8 may extend perpendicular to the first longitudinal direction L1 and/or against the second longitudinal direction L2.

The connection conduit 5 and/or the other connection conduit 8 may be tube-shaped and/or may have a circular cross section perpendicular to the first longitudinal direction L1 or the second longitudinal direction L2.

Figure 2:
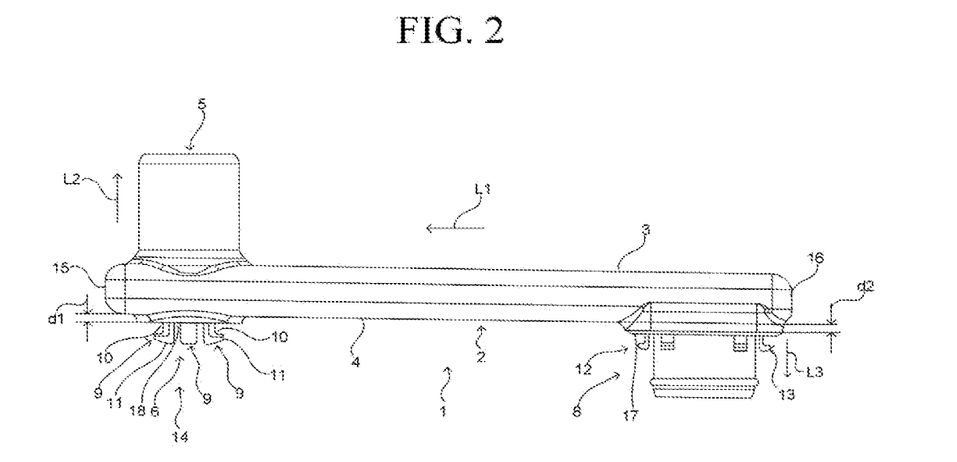
FIG. 2 illustrates another schematic perspective view of the exemplary embodiment of FIG. 1.

FIG. 2 shows the fluid connector 1 of the exemplary embodiment of FIG. 1 schematically in another perspective view, in which the first, second and third longitudinal directions L1, L2, L3 extend in the drawing plane.

The fastener 6 comprises at least one latch device 9 and, as shown in the exemplary embodiment of FIG. 2, several or a plurality of latch devices 9. Each latch device 9 comprises a latch arm 10 that is elastically deformable and that may extend along the second longitudinal direction L2. In the second longitudinal direction L2, the latch arm 10 is based on the main conduit 2. Away from the second side 4, the latch device 9 comprises a latch element 11, for example a latch protrusion or a latch recess that extends perpendicular to the latch arm 10.

Additionally, as shown in the view of FIG. 2, the fluid connector 1 may comprise another fastener 12. The other fastener 12 may comprise a plurality of other latch devices 13, wherein the other latch devices 13 of the other fastener 12 may be arranged on the second side 4 around the other connection conduit 8.

The fastener 6 may be arranged on a section 14 of the second side 4 that is closer to a first end 15 of the main conduit 2 than to a second end 16 of the main conduit 2, the first end 15 being opposite the second end 16, for example in the first longitudinal direction L1. The other fastener 12 may be arranged closer to the second end 16 than to the first end 15.

Surfaces 17, 18 on which the at least one latch device 9 and/or the other latch devices 13 are based may be flat and may extend perpendicular to any of the second and third longitudinal directions L2, L3.

The surfaces 17, 18 on which the at least one latch device 9 and/or the other latch devices 13 are based may each be arranged at a distance d1, d2 to other parts of the second side 4, the distances d1, d2 extending away from the first side 4 and for example in the third longitudinal direction L3. For example, the distances d1, d2 are equal.

Figure 3:
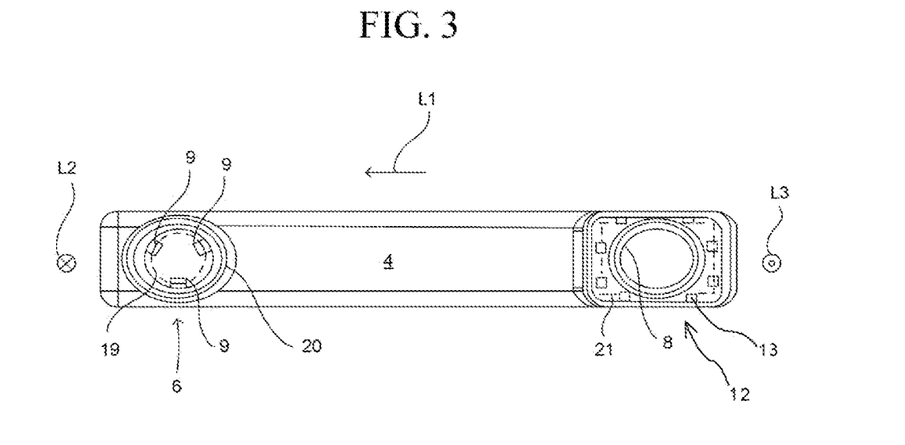
FIG. 3 illustrates yet another schematic perspective view of the exemplary embodiment of FIG. 1.

FIG. 3 shows the fluid connector 1 of the exemplary embodiment of FIG. 1 schematically in another perspective view, in which the third longitudinal direction L3 points out of the drawing plane.

As exemplarily shown in FIG. 3, the fastener 6 comprises three latch devices 9 that may be arranged at an edge of an imaginary circle 19. The center of the imaginary circle 19 may be arranged on a longitudinal axis of the connection conduit 5. The latch elements 11, which are shown without reference numeral in FIG. 3 for the sake of clarity, may each extend parallel to a radial direction of the imaginary circle 19, the respective radial direction extending through the respective latch device 9.

The fastener 6 may comprises an elastically deformable press element 20 that can surround the at least one latch device 9. Alternatively, the press element 20 can be surrounded by several latch devices 9 or can be arranged next to or flank the at least one latch device 9. For example, the press element has a ring shape, a polygonal shape or an essentially straight shape.

At least two of the other latch devices 13 of the other fastener 12 may be arranged on a side of an imaginary polygon 21, e.g. a rectangle, a hexagon etc., the other connection conduit 8 being arranged within the polygon 21. For example, at least two of the other latch devices 13 of the other fastener 12 may be are arranged on each side of the polygon 21. The latch elements of the other latch devices 13 may extend away or towards the other connection conduit 8 and/or perpendicular to the side of the imaginary polygon 21 on which they are respectively arranged.

Figure 4:
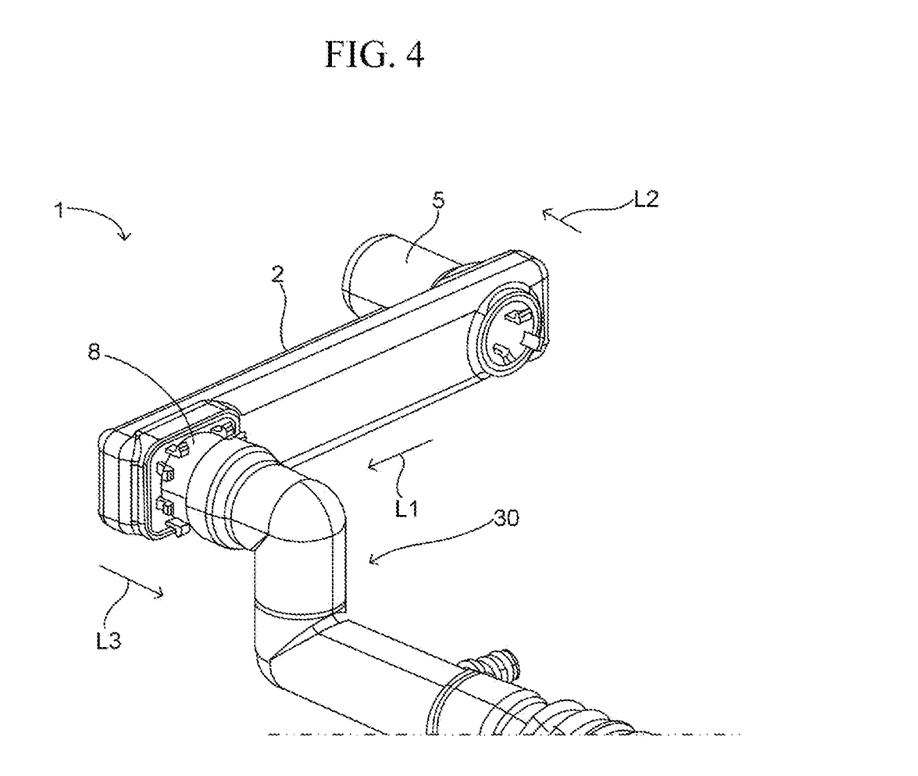
FIG. 4 illustrates another schematic perspective view of the exemplary embodiment of FIG. 1 connected to a fluid conduit of a battery pack according to an exemplary embodiment.

FIG. 4 shows the fluid connector 1 of the exemplary embodiment of FIG. 1 schematically in another perspective view and with a section of a fluid conduit of the battery pack, wherein the other connection conduit 8 is coupled to the fluid conduit.

The flow path extends from the connection conduit 5 to and through the main conduit to and through the other connection conduit 8 into a fluid conduit 30 of a battery pack.

Figure 5:
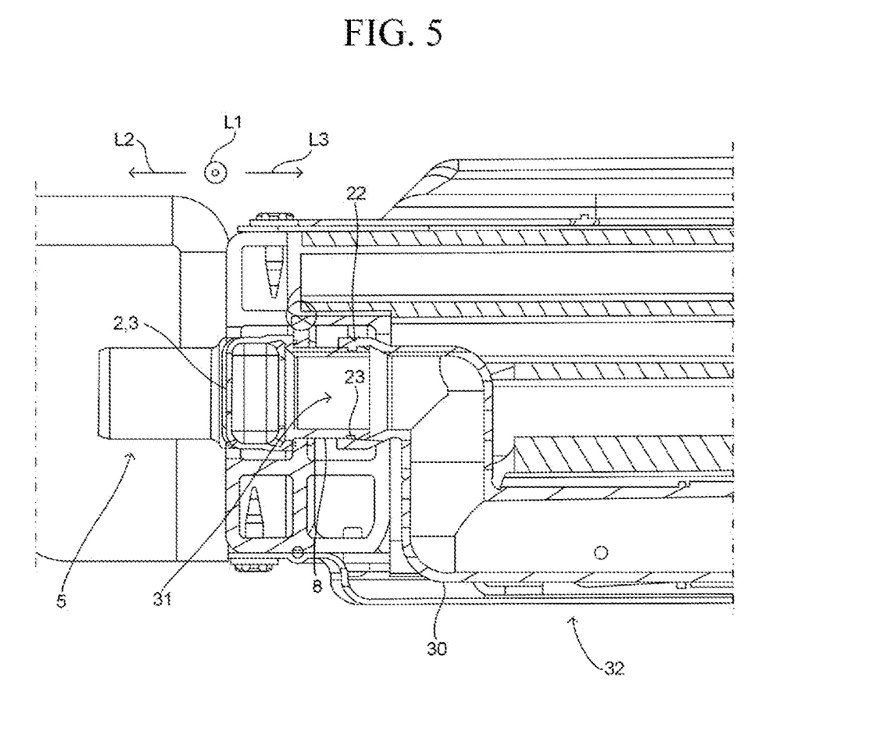
FIG. 5 schematically illustrates a cross sectional view of the exemplary embodiment of FIG. 1 with a battery pack according to an exemplary embodiment.

FIG. 5 shows the exemplary embodiment of FIG. 4 with a battery pack that comprises the fluid conduit 30 in a schematic cross-sectional view, wherein the cross section extends along the longitudinal axis of the other connection conduit 8.

The other connection conduit 8 is exemplarily shown inserted into an opening 31 of the fluid conduit 30 of the battery pack 32 along the third longitudinal direction L3. Alternatively, the part of the fluid conduit 30 that comprises the opening 31 may be inserted into the other connection conduit 8 against the third longitudinal direction L3.

The other connection conduit 8 comprises a groove 22 along its outer circumference for at least partly receiving a sealing ring 23. In the shown assembled state, the sealing ring 23 presses against the inner side of the fluid conduit 30 and thereby seals the connection between the other connection conduit 8 and the fluid conduit 30. Alternatively, in case the opening 31 is inserted into the other connection conduit 8, the groove may be formed in the inner circumference of the other connection conduit 8.

Figure 6:
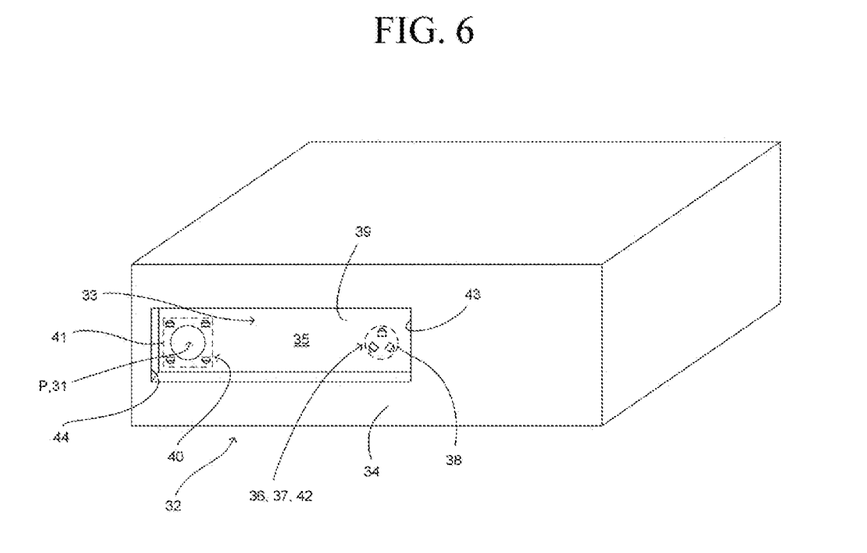
FIG. 6 illustrates a schematic perspective view of a battery pack according to an exemplary embodiment and as at least partly shown in FIGS. 4 and 5.

FIG. 6 shows an exemplary embodiment of the battery pack 32 for a vehicle in a schematic perspective view.

A fluid flow path P, for example for cooling fluid, may extend through the battery pack 32, wherein one opening 31 of the fluid flow path P is depicted in FIG. 6. The battery pack 32 comprises a groove 33 at an outer side 34 of the battery pack 32. A base side 35 of the groove 33 comprises the opening 31 of the fluid flow path P. Additionally the base side 35 comprises a counter fastener 36 for fastening the fastener 6, with at least one counter latch device 37, the counter latch device 37 being arranged at a distance to the opening 31.

The counter fastener 36 may comprise several counter latch devices 37, wherein the amount of the counter latch devices 37 may correspond to the amount of the latch devices 9.

At least selected of the counter latch devices 37 may be arranged at an edge of an imaginary circle 38, i.e. a circle that is defined by the positions of the counter latch devices 37. The imaginary circle 19 of the latch devices 9 and the imaginary circle 38 of the counter latch devices 37 may be identical.

At least the selected counter latch devices 37 may comprise an elastically deformable latch arm and/or a counter latch element, wherein the counter latch elements each extend parallel to a radial direction of the imaginary circle, the respective radial direction extending through the respective counter latch device. For example, the counter latch elements may be latch protrusions or latch recesses that extend towards or away from the center of the imaginary circle. In particular, the counter latch elements of the counter latch devices 37 may be formed matching (or complementary) to the latch elements 11 of the latch devices 9.

The base side 35 of the groove 33 may comprise a flat counter press section 39 for the elastically deformable press element 20, which the elastically deformable press element 20 may completely contact in case the fluid connector 1 is assembled to the battery pack 32.

For example, the at least one counter latch device 37 may surmount the counter press section 39 away from the base side 35 of the groove 33. Alternatively, the counter latch device 37 and in particular its latch element may be arranged in an opening or a hole that extends into the base side 35.

The counter press section 39 may have a circular or ring shape. For example, a center of the circular or ring shape may coincide with the center of the ring shape of the elastically deformable press element 20 in case the fluid connector 1 is mounted to the battery pack 32.

The battery pack 32 may comprise another counter fastener 40 with a plurality of counter latch devices, wherein the counter latch devices of the other counter fastener 40 may be arranged on or at least partly inside of the base side 35 of the groove 33 and in particular around the opening 31.

At least two of the counter latch devices of the other counter fastener 40 may be arranged on a side of an imaginary polygon 41, the opening 31 being arranged within the polygon 41. For example, at least two of the counter latch devices of the other counter fastener 40 are arranged on each side of the polygon 41.

In general, the corners of a polygon are formed by its sides, such that latch devices or counter latch devices that are arranged in the corners of the polygon are still arranged at least on one of the sides that forms the respective corner.

The counter fastener 36 may be arranged on a section 42 of the base side 35 that is closer to a first end 43 of the base side 35 than to a second end 44 of the base side 35, the first end 43 being opposite the second end 44 along an imaginary line that extends between the counter fastener 36 and the other counter fastener 40.

For example, the other counter fastener 40 is arranged closer to the second end 44 than to the first end 43. The counter fastener 36 and the other counter fastener 40, respectively, may be arranged at opposite ends of the base side 35.

Figure 7:
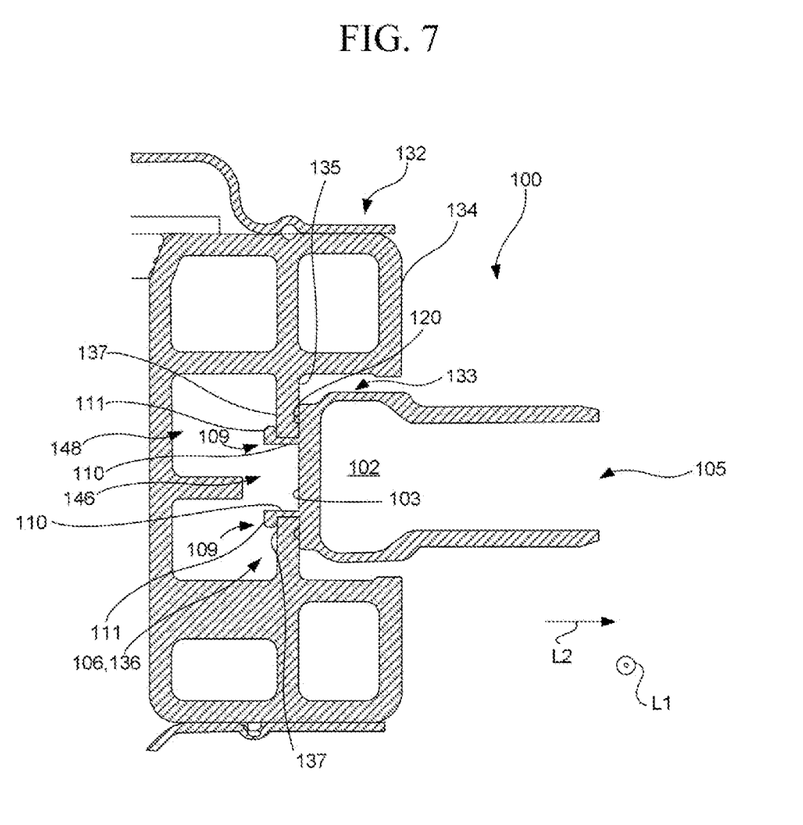
FIG. 7 schematically illustrates a cross sectional view of another exemplary embodiment of the fluid connector with another exemplary embodiment of the battery pack, and FIG. 8 schematically illustrates a cross sectional view of the exemplary embodiment of FIG. 7.

FIG. 7 shows another exemplary embodiment of the fluid connector 100 with another exemplary embodiment of the battery pack 132 that comprises the fluid conduit in a schematic cross-sectional view, wherein the cross-section extends along the longitudinal axis of the connection conduit 105. For the sake of brevity, only the differences with respect to the previous embodiment are described in the following.

The cross-sectional plane of FIG. 7 extends perpendicular to the first longitudinal direction L1 of the main conduit 102. The fluid connector 100 comprises a fastener 106 that, comparable to the fastener 6 of the previous embodiment, is arranged on the first side 103 of the fluid connector 100, the first side 103 facing away from the opening of the connection conduit 105. The fastener 106 comprises at least two latch devices 109 that are arranged opposite to each other with respect to the longitudinal axis of the connection conduit 105, i.e. a longitudinal axis of the connection conduit 105 is arranged between the two latch devices 109. The cross-sectional plane extends through the latch devices 109.

The latch devices 109 may be arranged opposite to each other with respect to the longitudinal axis of the connection conduit 105, but may not be arranged in the cross-sectional plane of FIG. 7, i.e. their position may be rotated around the longitudinal axis of the connection conduit 105 and compared to their position shown in FIG. 7.

The fluid connector 100 may comprise additional latch devices 109, which may or may not each be arranged opposite of another latch device 109. For example, the latch devices 109 may be arranged on an imaginary circle or at corners of an imaginary polygon.

The latch devices 109 each comprise a latch arm 110 that extends along the longitudinal axis of the connection conduit 105, and a latch element 111 that extends perpendicular to the longitudinal axis of the connection conduit 105 and for example away from a center of the imaginary circle or of the imaginary polygon, or away from an opposite latch device 109.

The battery pack 132 of the exemplary embodiment of FIG. 7 comprises a counter fastener 136 for fastening the fastener 106 and, hence, the fluid connector 100 to the battery pack 132. The counter fastener 136 comprises counter latch devices 137 that connect to the latch devices 109 in a latching, i.e. snap or form fit manner. For example, the counter latch devices 137 are formed as plates that end at a receiving opening 146. The receiving opening 146 is arranged between free ends of the plates forming the counter latch devices 137. The receiving opening 146 extends along the longitudinal axis of the connection conduit 105, such that the latch devices 109 can be introduced into the receiving opening 146 along the longitudinal axis of the connection conduit 105. While within the receiving opening 146, the latch elements 111 rest against and are deflected by the free ends of the plates forming the counter latch devices 137, such that the latch arms 110 are elastically deformed. Once the latch elements 111 have passed the receiving opening 146, the latch arms 110 relax and the latch elements 111 are arranged behind the free ends of the plates forming the counter latch devices 137 against the second longitudinal direction L2 of the connection conduit 105.

Against the second longitudinal direction L2 of the connection conduit 105 behind the receiving opening 146, the battery pack 132 comprises a free volume 148 for receiving at least the latch elements 111. At least perpendicular to the second longitudinal direction L2 of the connection conduit 105, the free volume 148 is larger than the receiving opening 146.

The form of the edge of the receiving opening 146 may essentially correspond to the form of the imaginary circle or of the imaginary polygon. Alternatively, in particular in case the fastener 106 comprises the at least the two latch devices 109 shown in FIG. 7, the receiving opening 146 may be formed as an elongated slit that extends along the first longitudinal direction L1.

For the sake of vividly depicting the press element 120, the press element 120 is shown pressed into the base side 135 of the groove 133 that is arranged in the outer side 134 of the battery pack 132. Yet, in fact, the press element 120 would not be pressed into the base side 135, but would, rather, be elastically compressed.

The receiving opening 146 is exemplarily shown formed in or through the base side 135.

Alternatively, the battery pack 32 of the previous embodiment and in particular the counter fastener 36 may be adapted to be affixed to the fluid connector 100, e.g. by appropriately arranging the counter latch devices 37.

As a further alternative, the battery pack 132 and in particular the fastener 106 may be adapted to be affixed to the fluid connector 1, e.g. by appropriately arranging the counter latch devices 137 of the counter fastener 136.

Figure 8:
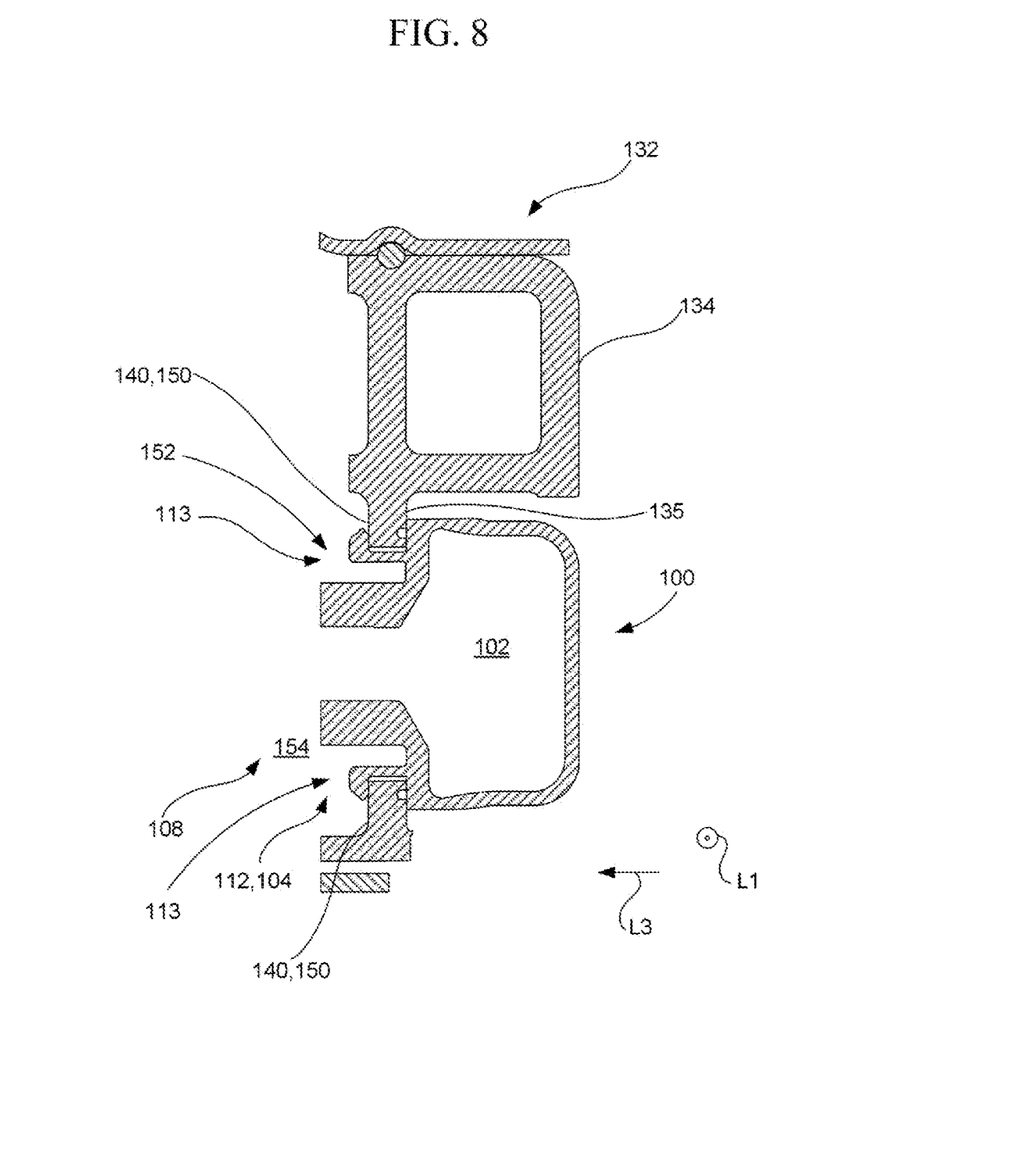

FIG. 8 shows the exemplary embodiment of FIG. 7 in another schematic cross-sectional view, wherein the cross section extends along the longitudinal axis of the other connection conduit 108.

The cross-sectional plane extends perpendicular to the first longitudinal direction L1 of the main conduit 102. The fluid connector 100 comprises another fastener 112 that, comparable to the other fastener 12 of the previous embodiment, is arranged on the second side 104 of the fluid connector 100. The other fastener 112 comprises at least two other latch devices 113 that are arranged opposite to each other with respect to the longitudinal axis of the other connection conduit 108, i.e. the longitudinal axis of the other connection conduit 108 is arranged between the two other latch devices 113. The other connection conduit 108 is arranged between the other latch devices 113. The cross-sectional plane extends through the other latch devices 113.

The other latch devices 113 may be arranged opposite to each other with respect to the longitudinal axis of the other connection conduit 108, but may not be arranged in the cross-sectional plane of FIG. 7, i.e. their position may be shifted perpendicular to or rotated around the longitudinal axis of the other connection conduit 108.

The fluid connector 100 may comprise additional other latch devices 113, which may or may not each be arranged opposite of another one of the other latch devices 113. For example, the other latch devices 113 may be arranged on an imaginary circle or at corners of an imaginary polygon.

The other latch devices 113 each comprise a latch arm that extends along the longitudinal axis of the other connection conduit 108, and a latch element that extends perpendicular to the longitudinal axis of the other connection conduit 108 and for example away from a center of the imaginary circle or of the imaginary polygon, or away from an opposite other latch device 113.

The battery pack 132 of the exemplary embodiment of FIG. 8 comprises another counter fastener 140 for fastening the other fastener 112 and, hence, the fluid connector 100, to the battery pack 132.

The other counter fastener 140 comprises other counter latch devices 150 that connect to the other latch devices 113 in a latching, i.e. snap or form fit manner. For example, the other counter latch devices 150 are formed as plates that end at another receiving opening 152. The other receiving opening 152 is arranged between free ends of the plates forming the other counter latch devices 150. The other receiving opening 152 extends along the longitudinal axis of the other connection conduit 108, such that the other latch devices 113 can be introduced into the other receiving opening 152 along the longitudinal axis of the other connection conduit 108. While within the other receiving opening 152, the latch elements of the other latch devices 113 rest against and are deflected by the free ends of the plates forming the other counter latch devices 150, such that the latch arms are elastically deformed. Once the other latch elements have passed the other receiving opening 152, the latch arms relax and the latch elements are arranged behind the free ends of the plates forming the other counter latch devices 150 along the third longitudinal direction L3 of the other connection conduit 108.

In the longitudinal direction L3 of the other connection conduit 108 behind the opening, the battery pack 132 comprises another free volume 154 for receiving at least the latch elements of the other latch devices. At least perpendicular to the third longitudinal direction L3 of the other connection conduit 108, the other free volume 154 is larger than the other receiving opening 152.

The form of the edge of the other receiving opening 152 may essentially correspond to the form of the imaginary circle or of the imaginary polygon. Alternatively, in particular in case the other fastener 112 comprises the at least the two other latch devices 113 shown in FIG. 8, the other receiving opening 152 may be formed as an elongated slit that extends along the first longitudinal direction L1.

The receiving openings 146 and 152 may be formed separate from and at a distance to each other or may be formed as one continuous receiving opening. Similarly, the free volumes 148 and 154 may be formed separate from and at a distance to each other or may be formed continuously.

Alternatively, the battery pack 32 of the previous embodiment and in particular the other counter fastener 40 may be adapted to be affixed to the fluid connector 100, e.g. by appropriately arranging the other counter latch devices of the other counter fastener 40.

As a further alternative, the battery pack 132 and in particular the other counter fastener 140 may be adapted to be affixed to the fluid connector 1, e.g. by appropriately arranging the other counter latch devices 150 of the other counter fastener 140.

Although the invention has been explained in relation to its preferred embodiments as described above, it is to be understood that many other possible modifications and variations can be made without departing from the scope of the present invention. It is, therefore, contemplated that the appended claim or claims will cover such modifications and variations that fall within the scope of the invention.

REFERENCE SIGNS 1, 100 fluid connector
2, 102 main conduit
5, 105 connection conduit
6, 106 fastener
8, 108 other connection conduit
9, 109 latch device
10, 110 latch arm
11, 111 latch element
12, 112 other fastener
30 fluid conduit
32, 132 battery pack
36, 136 counter fastener
37, 137 counter latch device
40, 140 other counter fastener
146 receiving opening
148 free volume
150 other counter latch devices
152 other receiving opening

The invention claimed is:

1. A fluid connector for a battery pack of a vehicle, the fluid connector comprising:
   a main conduit extending in a first longitudinal direction;
   at least one connection conduit that protrudes from a first side of the main conduit in a second longitudinal direction, the first and second longitudinal directions being perpendicular to each other, wherein a fluid flow path extends from the main conduit to and through the connection conduit; and
   a fastener with at least one latch device for fastening the fluid connector to the battery pack, the fastener being arranged at a second side of the main conduit and aligned with the connection conduit in the second longitudinal direction, the second side being arranged opposite to the first side in the second longitudinal direction.

2. The fluid connector for a battery pack of a vehicle according to claim 1,
   wherein the connection conduit comprises an outer wall that extends along the second longitudinal direction, and
   wherein the latch device is surrounded by a projection of the outer wall, the projection extending along the second longitudinal direction.

3. The fluid connector for a battery pack of a vehicle according to claim 1, wherein the fastener comprises several latch devices, and
   wherein at least selected ones of the latch devices are arranged equidistant from a center point.

4. The fluid connector for a battery pack of a vehicle according to claim 3, wherein the center point a longitudinal axis of the connection conduit.

5. The fluid connector for a battery pack of a vehicle according to claim 4, wherein at least the selected ones of the latch devices comprise an elastically deformable latch arm and a latch element, and
   wherein the latch element extends parallel to the longitudinal axis of the connection conduit.

6. The fluid connector for a battery pack of a vehicle according to claim 1, wherein the fastener comprises an elastically deformable press element that surrounds the at least one latch device.

7. The fluid connector for a battery pack of a vehicle according to claim 6, wherein the press element has a ring shape.

8. The fluid connector for a battery pack of a vehicle according to claim 1, further comprising a second connection conduit that protrudes from the second side of the main conduit.

9. The fluid connector for a battery pack of a vehicle according to claim 8, further comprising a second fastener with a plurality of latch devices,
   wherein the latch devices of the second fastener are arranged on the second side of the main conduit around the second connection conduit.

10. The fluid connector for a battery pack of a vehicle according to claim 9, wherein at least two of the latch devices of the second fastener are arranged around a periphery of the second connection conduit.

11. The fluid connector for a battery pack of a vehicle according to claim 10, wherein the at least two of the latch devices of the second fastener are arranged on different sides of the second connection conduit.

12. The fluid connector for a battery pack of a vehicle according to claim 9, wherein the main conduit comprises a first end and a second end, the first end being opposite the second end, and
   wherein the fastener is arranged on a section of the second side that is closer to the first end than to the second end.

13. The fluid connector for a battery pack of a vehicle according to claim 12, wherein the second fastener is arranged closer to the second end than to the first end.

14. A battery pack for a vehicle comprising the fluid connector according to claim 1.

15. A battery pack for a vehicle, the battery pack comprising a fluid connector according to claim 1 and having a fluid flow path that extends through the battery pack, and with a groove at an outer side of the battery pack, wherein a base side of the groove comprises an opening of the fluid flow path and a counter fastener with at least one counter latch device, the counter latch device being arranged at a distance to the opening.

\* \* \* \* \*

UNITED STATES PATENT AND TRADEMARK OFFICE
CERTIFICATE OF CORRECTION

| | | |
|---|---|---|
| PATENT NO. | : 11,476,521 B2 | Page 1 of 1 |
| APPLICATION NO. | : 16/770748 | |
| DATED | : October 18, 2022 | |
| INVENTOR(S) | : Carl-Michael Masaryk | |

It is certified that error appears in the above-identified patent and that said Letters Patent is hereby corrected as shown below:

In the Claims

Column 16, Line 7, Claim 4      After "point" insert -- is --

Signed and Sealed this
Eighteenth Day of July, 2023

Katherine Kelly Vidal
*Director of the United States Patent and Trademark Office*